United States Patent
Nanikawa et al.

(10) Patent No.: US 6,690,759 B1
(45) Date of Patent: Feb. 10, 2004

(54) ZIRCONIUM-BASE ALLOY AND NUCLEAR REACTOR COMPONENT COMPRISING THE SAME

(75) Inventors: Shuichi Nanikawa, Yokosuka (JP); Shinji Ishimoto, Yokosuka (JP); Toshio Kubo, Yokosuka (JP)

(73) Assignee: Global Nuclear Fuel - Japan Co., Ltd., Tokyo-To (JP)

( * ) Notice: Subject to any disclaimer, the term of this patent is extended or adjusted under 35 U.S.C. 154(b) by 2 days.

(21) Appl. No.: 10/263,714

(22) Filed: Oct. 4, 2002

(51) Int. Cl.$^7$ ................................. G21C 3/07
(52) U.S. Cl. ............... 376/457; 434/298; 148/11.5; 148/95; 148/421; 148/422; 148/672; 420/7; 420/8; 420/125; 420/422; 420/441; 420/588
(58) Field of Search ............... 376/457; 434/298; 148/95, 421, 422, 672, 11.5; 420/7, 8, 125, 422, 441, 588

(56) References Cited

U.S. PATENT DOCUMENTS

| | | | |
|---|---|---|---|
| 4,678,521 A | | 7/1987 | Yoshida et al. ............. 148/11.5 |
| 4,810,461 A | * | 3/1989 | Inagaki et al. .............. 376/457 |
| 4,863,679 A | | 9/1989 | Imahashi et al. ........... 376/417 |
| 5,264,724 A | * | 11/1993 | Brown et al. ............... 257/347 |
| 5,297,177 A | * | 3/1994 | Inagaki et al. .............. 376/462 |
| 5,366,690 A | * | 11/1994 | Garde ........................ 420/422 |
| 5,712,888 A | * | 1/1998 | Adamson et al. ........... 376/416 |

FOREIGN PATENT DOCUMENTS

| | | | |
|---|---|---|---|
| EP | 0154559 | | 9/1985 |
| EP | 1225243 A1 | * | 7/2002 |
| FR | 002769637 A1 | * | 4/1999 |
| JP | 58-22364 | | 2/1983 |
| JP | 58-022365 | | 2/1983 |
| JP | 60-043450 | | 3/1985 |
| JP | 62-228442 | * | 1/1987 |
| JP | 62-228442 | | 10/1987 |
| JP | 10265921 A | * | 10/1998 |
| JP | 2001074872 | * | 3/2001 |

OTHER PUBLICATIONS

Motta et al, "Phase formation in Zr–Fe multilayers: effect of radiation", Journal of Applied Physics, May 1999, pp. 7146–7158.*

Etoh et al, "The effect of microstructure on corrosion behavior of Zircally–2 in BWR's", ASTM STP–1354, 2000, pp 658–677.*

Sabol, George P. et al. "Zirconium in the Nuclear Industry: Twelfth International Symposium". ASTM Stock No. STP 1354. Copyright 2000.

* cited by examiner

Primary Examiner—Michael J. Carone
Assistant Examiner—John Richardson

(57) ABSTRACT

Disclosed herein are zirconium-base alloys excellent in both corrosion resistance and hydrogen absorption property, useful as materials for nuclear reactors. Such a zirconium-base alloy for nuclear reactors comprises 0.5–2 wt. % Sn, 0.07–0.6 wt. % Fe, 0.03–0.2 wt. % Ni, 0.05–0.2 wt. % Cr, and the balance being zirconium and unavoidable impurities, wherein the Fe content (X wt. %) of the zirconium-base alloy and the mean size (Y nm) of precipitates in the zirconium-base alloy are present in a region on the x (Fe content X) and y (mean precipitate size) rectangular coordinates, surrounded by the following five lines: i) Y=−444×X+154, ii) Y=910×X−46, iii) Y=0, iv) Y=300, and v) X=0.6.

6 Claims, 8 Drawing Sheets

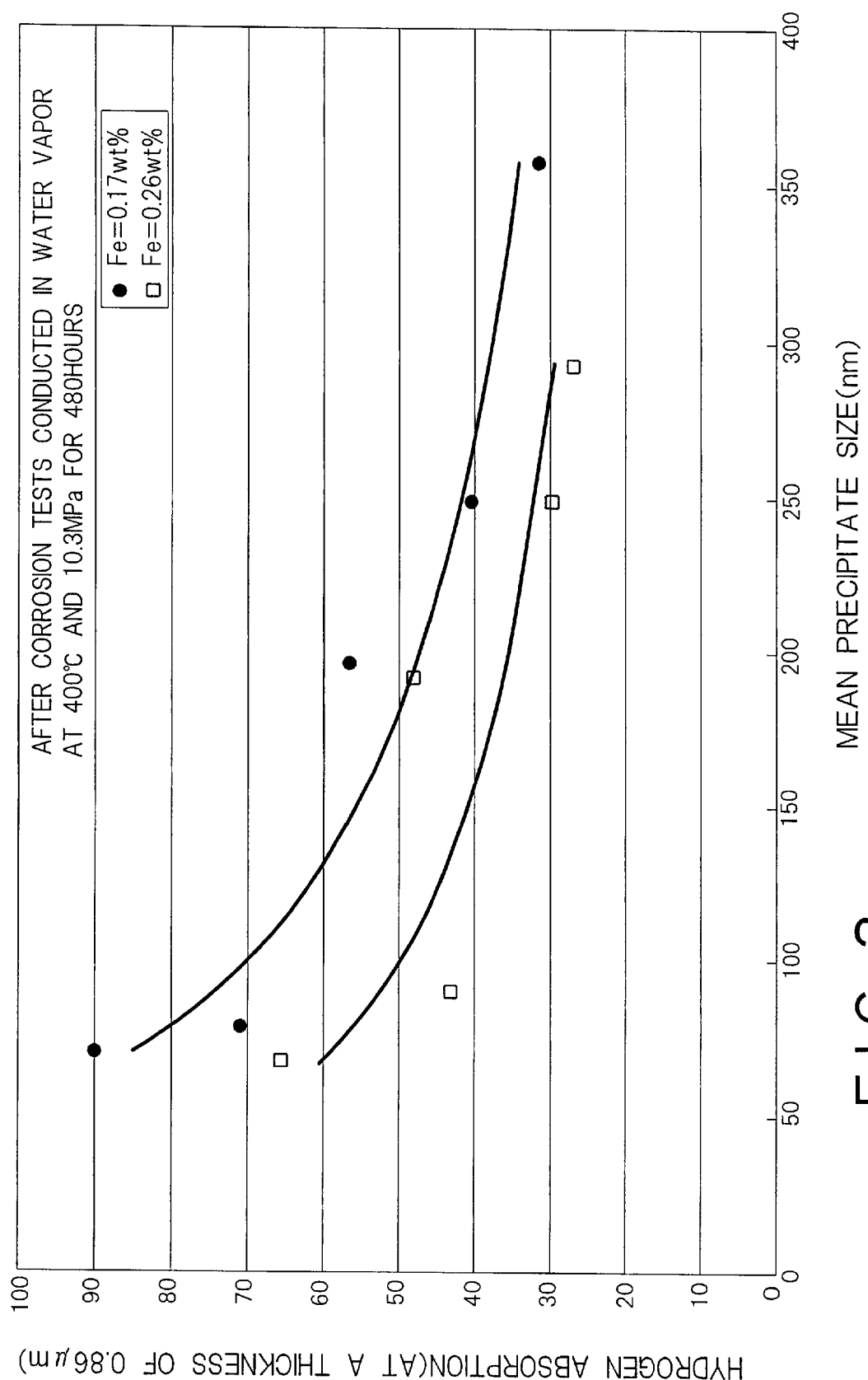
F I G. 3

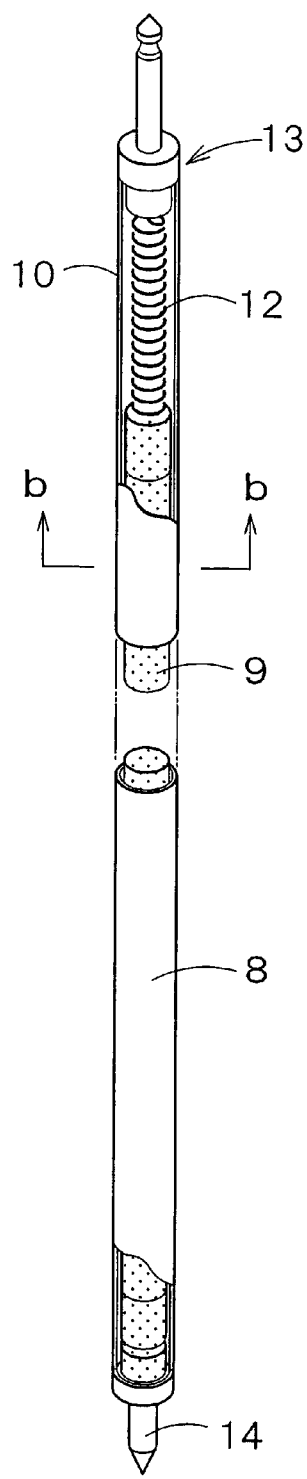
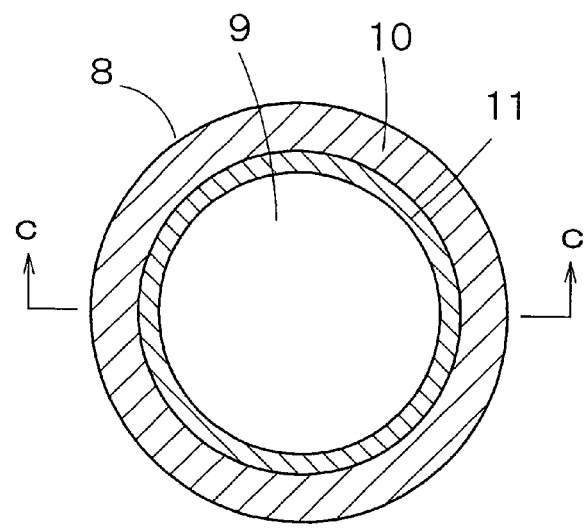
FIG. 9B
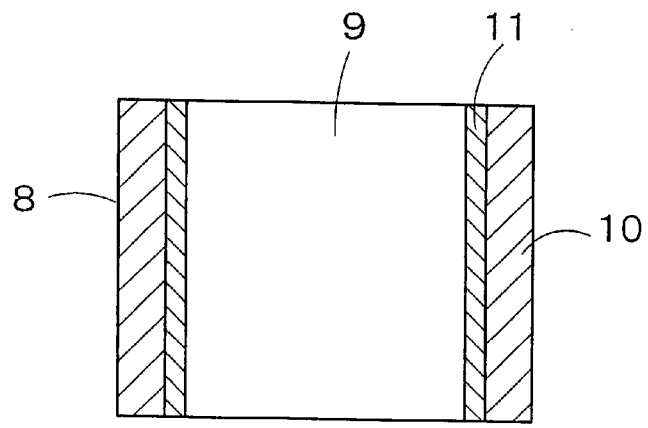
FIG. 9C
FIG. 9A

ZIRCONIUM-BASE ALLOY AND NUCLEAR REACTOR COMPONENT COMPRISING THE SAME

BACKGROUND OF THE INVENTION

1. Field of the Invention

The present invention relates to zirconium-base alloys for nuclear reactors and to nuclear reactor components comprising the zirconium-base alloys.

2. Background Art

Zirconium alloys are now extensively used as fuel cladding materials and core structural materials in boiling-water reactors, pressurized-water reactors, and so forth. The most commonly employed so far are Zircaloy-2 containing 1.2–1.7 wt. % Sn, 0.07–0.20 wt. % Fe, 0.05–0.15 wt. % Cr, 0.03–0.08 wt. % Ni, and the balance being Zr, and Zircaloy-4 containing 1.2–1.7 wt. % Sn, 0.18–0.24 wt. % Fe, 0.07–0.13 wt. % Cr, and the balance being Zr. In addition to these zirconium alloys, Zr–2.5% Nb alloy, Zr–1% Nb alloy, etc. are used for nuclear reactors as well. The above-described zirconium alloys have been developed in view of neutron economy, strength and corrosion resistance.

One problem with boiling-water reactors is that corrosion called nodular corrosion occurs, during operation, at localized regions on the surfaces of the above-described materials to give lenticular corrosion layers. The nodular corrosion process proceeds with the progress of irradiation, and the corrosion layers can come off when they got thick. Thus, if nodular corrosion occurs, structural materials undergo decrease in thickness. Moreover, since the falling of corrosion layers increases the radioactivity in a coolant, there is such a fear that the exposure dose during periodic inspection becomes higher. Known techniques for preventing occurrence of nodular corrosion include a heat treatment method in which an alloy is heated, for a short period of time, at a temperature in the temperature range in which the alloy exists in $\alpha+\beta$ or $\beta$ phase and is then rapidly quenched (Japanese Patent Publications Nos. 45699/1986 and No. 58223/1988), and a method in which the composition of an alloy is modified (Japanese Laid-Open Patent Publications No. 43450/1985 and No. 228442/1987).

For example, in the process of heat treatment in which a zircaloy once heated to a high temperature in the temperature range in which the alloy exists in $\alpha+\beta$ or $\beta$ phase is rapidly quenched ($\alpha+\beta$-quenching or $\beta$-quenching), intermetallic compounds present in the alloy as precipitates (mainly, two types of compounds $Zr(Cr, Fe)_2$ and $Zr_2(Ni, Fe)$ are present) are fine. It is known that since the precipitates are fine in the course of $\alpha+\beta$ or $\beta$ quenching, occurrence of nodular corrosion is prevented to greatly improve the corrosion resistance of the alloy.

Occurrence of nodular corrosion is successfully prevented by the above-described means, and the type of corrosion is now being shifted to uniform corrosion in which an oxide film, corrosion product, grows uniformly.

The above-described materials having improved resistance to nodular corrosion tend to uniformly corrode to give, on their surfaces, uniform oxide films, which are extremely thin and show excellent protective properties. It can, therefore, be said that these materials satisfactorily fulfill their functions under the conditions of operation of the current nuclear reactors.

For the purpose of improving the economical efficiency of the current nuclear power plants, on the other hand, efforts are now being made step by step to further increase fuel burn-up. If the in-core fuel dwelling time becomes longer with the increase in fuel burn-up, alloys to be used for reactor components are required to have not only corrosion resistance but also proper hydrogen absorption characteristics. Namely, such a possibility is pointed out that if the in-core fuel dwelling time becomes longer, zirconium-alloy-based materials absorb increased amounts of hydrogen and structural materials made from such materials are embrittled.

As described in Japanese Laid-Open Patent Publication No. 228442/1987, it is qualitatively known that zircaloys having higher Fe contents absorb decreased amounts of hydrogen. In the light of this fact, Zircaloy-2, which is now mainly used for boiling-water reactors, has been modified, for example, by increasing its Fe content within the specified range. The modified Zircaloy-2 well functions under the current operating conditions when viewed from corrosion resistance and hydrogen absorption characteristics. However, due to such a change in circumstances that hydrogen is fed to the coolant water supply system of a nuclear reactor and due to a demand for decrease in the wall thickness of fuel structural materials, the hydrogen absorption requirements, in particular, are becoming severer in recent years. To lower hydrogen absorption is, therefore, an important matter for improvement in the reliability and performance of nuclear reactor fuels.

To meet the long-term use of nuclear reactors involving the attainment of high burn-up and to cope with such a change in circumstances as feeding of hydrogen and so on, it is urgently demanded to develop zirconium alloys that have high corrosion resistance and less absorb hydrogen.

SUMMARY OF THE INVENTION

The present invention relates to zirconium alloys for use in nuclear reactors. An object of the present invention is to provide zirconium-base alloys that show high corrosion resistance and low hydrogen absorption even when they are used, under the core conditions, in light-water-cooled nuclear power reactors for a prolonged period of time, and nuclear reactor components comprising the zirconium-base alloys.

A zirconium-base alloy for nuclear reactors according to the present invention comprises 0.5–2 wt. % Sn, 0.07–0.6 wt. % Fe, 0.03–0.2 wt. % Ni, 0.05–0.2 wt. % Cr, and the balance being zirconium and unavoidable impurities, wherein the Fe content (X wt. %) of the zirconium-base alloy and the mean size (Y nm) of precipitates in the zirconium-base alloy are present in a region on the x (Fe content X) and y (mean precipitate size) rectangular coordinates, surrounded by the following five lines:

i) $Y = -444 \times X + 154$, ii) $Y = 910 \times X - 46$, iii) $Y = 0$, iv) $Y = 300$, and v) $X = 0.6$.

A preferable zirconium-base alloy for nuclear reactors according to the present invention is one in which the above-described equation i) is $Y = -989 \times X + 362$.

Further, a zirconium-base alloy for nuclear reactors according to the present invention comprises 0.5–2 wt. % Sn, 0.07–0.6 wt. % Fe, 0.03–0.2 wt. % Ni, 0.05–0.2 wt. % Cr, and the balance being zirconium and unavoidable impurities, wherein the Fe content (X wt. %) and the annealing parameter ($\Sigma Ai$) of the zirconium-base alloy are present in a region on the x (Fe content X) and y (annealing parameter) rectangular coordinates, surrounded by the following five lines:

i) $30+1.6\times10^7\times\exp(0.7\times\log(Y))=-444\times X+154$,
ii) $30+1.6\times10^7\times\exp(0.7\times\log(Y))=910\times X-46$,
iii) $Y=1\times10^{-21}$,
iv) $Y=1\times10^{-15}$, and
v) $X=0.6$.

A preferable zirconium-base alloy for nuclear reactors according to the present invention is one in which the above-described equation i) is $30+1.6\times10^7\times\exp(0.7\times\log(Y))=-989\times X+362$.

The mean size (Y nm) of precipitates in a zirconium-base alloy can be determined, for example, by the following method: a zirconium-base alloy is made into a thin film, and precipitates contained in this thin film are observed by a transmission electron microscope; the images of the precipitates are recorded as image data; and these data are analyzed to determine the diameters of circles approximate to the precipitates and the mean diameter is then obtained by calculation. Another method useful for determining the mean precipitate size is as follows: a zirconium-base alloy is chemically etched, and precipitates on the etched alloy surface are observed by a scanning electron microscope. In general, approximately 200 precipitates are needed to obtain stable size distribution, so that it is desirable to observe 200 or more precipitates.

The annealing parameter ($\Sigma Ai$) is an index of the amount of heat a zirconium-base alloy gains during heat treatment, such as annealing, that is conducted after subjecting the alloy to $\beta$ or $\alpha+\beta$-quenching. The annealing parameter can be quantified by using the following equation:

$$\Sigma Ai = \Sigma ti \times \exp(-40,000/Ti)$$

wherein ti is a retention time (h) at a heat treatment temperature Ti, and Ti is a heat treatment temperature (K). The $\beta$-quenching herein means that a zirconium-base alloy is heated to a temperature in the temperature range in which the alloy exists in $\beta$ phase and is then rapidly quenched, and the $\alpha+\beta$-quenching means that a zirconium-base alloy is heated to a temperature in the temperature range in which the alloy exists in $\alpha+\beta$ phase and is then rapidly quenched.

In the above-described zirconium-base alloy according to the present invention, the region surrounded by the lines i)–v) on the rectangular coordinates defining the Fe content (X wt. %) of the zirconium-base alloy and the mean size (Y nm) of precipitates in the zirconium-base-alloy is as shown in FIG. 1 or 2.

A nuclear reactor component according to the present invention comprises the above-described zirconium alloy.

The zirconium alloys of the present invention are excellent in both corrosion resistance and hydrogen absorption characteristics and are useful as materials for nuclear reactors. In particular, they are excellent as fuel cladding materials for use in nuclear fuel elements, and can increase the cladding life.

BRIEF DESCRIPTION OF THE DRAWINGS

In the drawings,

FIG. 3 is a graph showing the relationship between hydrogen absorption and mean precipitate size, plotting mean precipitate size (nm) as the abscissa and, as the ordinate, hydrogen absorption (ppm) calculated with the wall thickness taken as 0.86 $\mu$m, where the data graphed are the results of corrosion tests conducted in water vapor at 400° C. and 10.3 MPa for 480 hours, FIG. 9A is a perspective view showing the structure of a fuel rod, FIG. 9B is a sectional view of the fuel rod, taken along line b—b of FIG. 9A, and FIG. 9C is a sectional view of the fuel rod, taken along line c—c of FIG. 9B, the fuel rod containing a tubular fuel cladding 8, a nuclear fuel material ($UO_2$) 9, a tube 10 made from an improved zirconium alloy of the present invention, a pure-zirconium-made layer 11, a plenum 12, an upper end plug 13 and a lower end plug 14.

DETAILED DESCRIPTION OF THE INVENTION

In order to establish material specifications for zirconium alloys excellent in both corrosion resistance and hydrogen absorption characteristics, we separately reviewed the data on corrosion resistance and those on hydrogen absorption characteristics. With respect to corrosion resistance, it has already been known from Y. Etoh et al. ASTM STP 1354, p. 661 (2000) that if the mean precipitate size is made smaller, the maximum oxide film thickness decreases to improve corrosion resistance. The reason why the oxide film thickness increases with mean precipitate size is that nodular corrosion occurs. On the other hand, the reason why the oxide film thickness decreases with mean precipitate size is that the occurrence of nodular corrosion is prevented.

Next, we studied means for lowering hydrogen absorption and reached the conclusion that when the mean size of precipitates in a zirconium-base alloy is made greater, the hydrogen absorption of the alloy becomes lower. The relationship between the hydrogen absorption determined by corrosion tests carried out in water vapor at 400° C. and 10.3 MPa for 480 hours and mean precipitate size is shown in the graph in FIG. 3. This graph clearly shows that the greater is the mean precipitate size, the lower is the hydrogen absorption. The graph also shows that this tendency can be observed even when the Fe content is made higher.

From the outcome of the studies on the hydrogen absorption characteristics of zircaloys, it can be concluded that it is possible to lower the hydrogen absorption of zircaloys by increasing the mean sizes of precipitates in the alloys or the Fe contents of the alloys. However, with respect to corrosion resistance, if the mean precipitate size is made greater, nodular corrosion occurs to give an oxide film having a greater thickness. It was thus realized that improvement in corrosion resistance and lowering of hydrogen absorption conflicted with each other when viewed from mean precipitate size.

Figure 4:
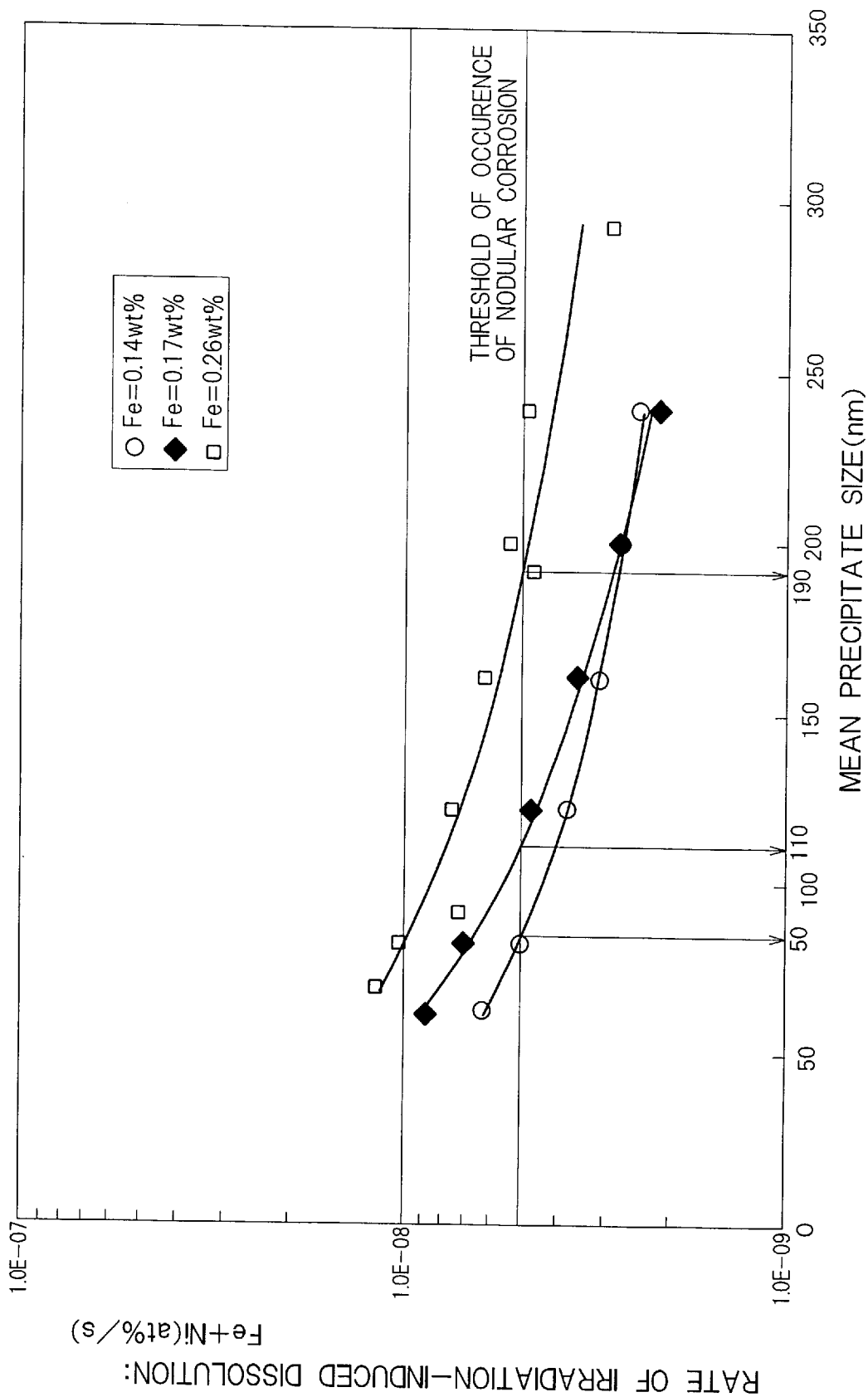
FIG. 4 is a graph showing the relationship between nodular corrosion susceptibility and mean precipitate size, plotting mean precipitate size (nm) as the abscissa and, as the ordinate, the rate (Fe+Ni: at %/s) of irradiation-induced dissolution of atoms sputtered from precipitates at the initial stage of irradiation.

As will be described hereinafter in detail, we tried to establish material specifications for zirconium alloys that are excellent in both corrosion resistance and hydrogen absorption characteristics. Firstly, as for corrosion resistance, an oxide film, corrosion layer, formed under such conditions that nodular condition does not occur is extremely thin and uniform and has high corrosion resistance, as long as the mean precipitate size is small. We, therefore, considered that it was important to determine the threshold of occurrence of nodular corrosion, that is, the minimum precipitate size that would be the cause of nodular corrosion. With respect to precipitates in a zircaloy (mainly, two types of precipitates, $Zr(Cr, Fe)_2$ and $Zr_2(Ni, Fe)$ are present), it is known that so-called irradiation-induced dissolution occurs, where such atoms as Fe, Cr and Ni are sputtered from the precipitates by irradiation and are dissolved in a metal. From our studies, it was found that this irradiation-induced dissolution phenomenon was closely relates to the occurrence of nodular corrosion. Namely, it was found that nodular corrosion did not occur as long as the rate of dissolution, in a matrix, of Fe and Ni sputtered from precipitates was above a certain value. This correlation is shown in FIG. 4. The graph in FIG. 4 shows the relationship, at three different Fe contents, between mean precipitate size and the rate of dissolution of Fe and Ni, that is, Fe+Ni (at %/s). In FIG. 4, the region under each curve, below the threshold of occurrence of nodular corrosion is a nodular-corrosion-occurring region. These curves show that the threshold precipitate size of occurrence of nodular corrosion increases with Fe content.

Figure 1:
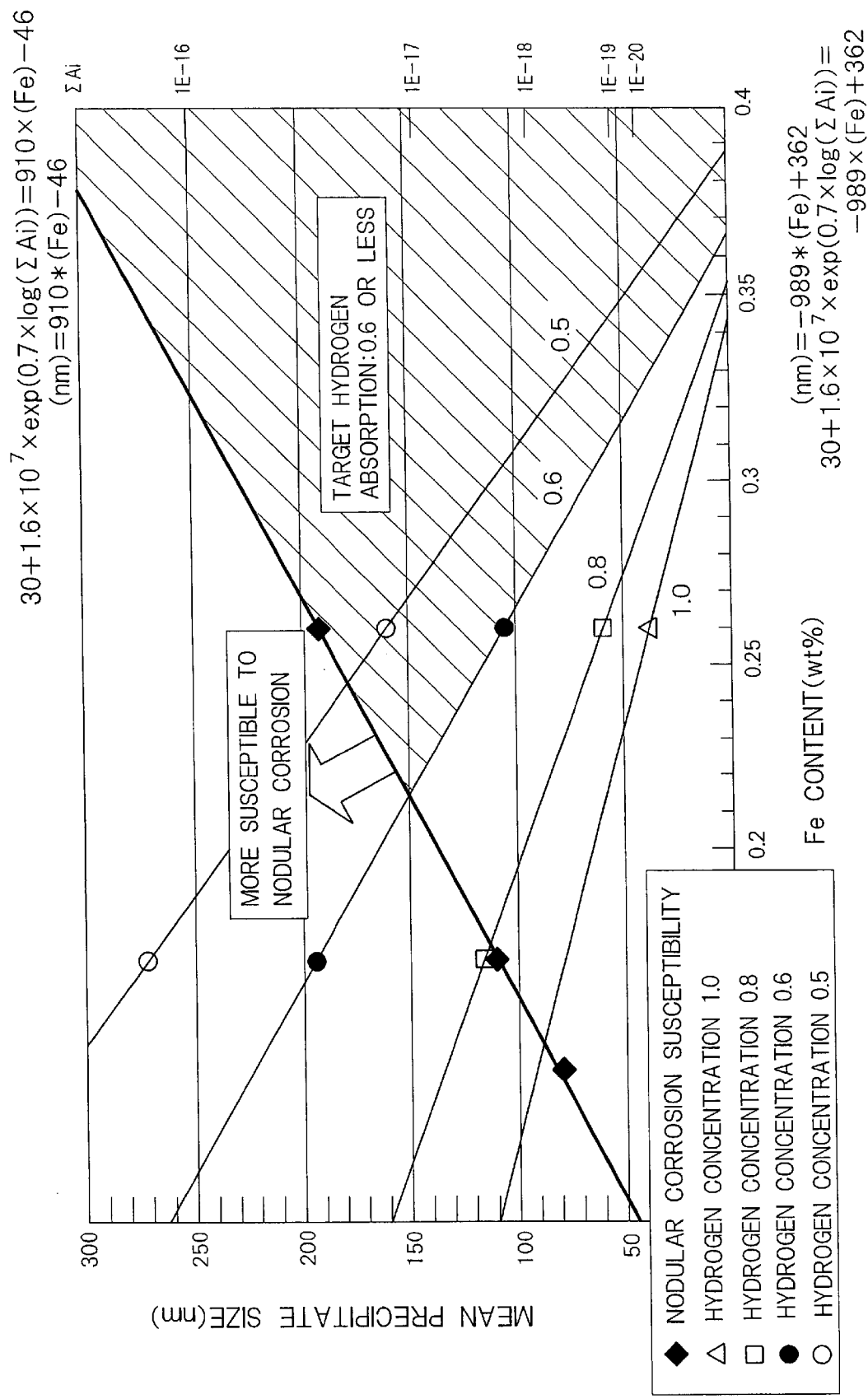
FIG. 1 is a diagram showing the material specifications in the present invention (the target hydrogen absorption is 60% or less of the hydrogen absorption of the conventional materials), plotting Fe content (wt. %) as the abscissa, mean precipitate size (nm) as the Y-axis, and $\Sigma Ai$ as the Y2-axis.

The threshold of occurrence of nodular corrosion determined as described above is shown on the diagram in FIG. 1. FIG. 1 is a diagram using rectangular coordinates, plotting Fe content (wt. %) as the X-axis and mean precipitate diameter (nm) as the Y-axis. In FIG. 1, the region on the upper left side of the line of the threshold of nodular corrosion is a nodular-corrosion-occurring region. It can be known that the threshold precipitate size of occurrence of nodular corrosion gradually increases with Fe content.

Next, the relationship between hydrogen absorption property and mean precipitate size is reviewed. As shown in FIG. 3, although it is clear that the hydrogen absorption lowers as the mean precipitate size increases, it can also be known that the hydrogen absorption depends also on Fe content. Accordingly, the relationship between hydrogen absorption and Fe content and the relationship between hydrogen absorption and means precipitate size were reviewed by referring to the graphed data in FIG. 3. With respect to hydrogen absorption, the hydrogen absorption of Zircaloy-2 having an Fe content of 0.16–0.18 wt. % and a mean precipitate size of 50–90 nm was normalized to be 1. The relative amounts of hydrogen absorption thus normalized are shown in FIG. 1. FIG. 1 shows the lines at relative amounts of hydrogen absorption of 0.5, 0.6, 0.8 and 1.0.

It is understood from FIG. 1 that it is possible to lower the hydrogen absorption by increasing the Fe content or mean precipitate size. However, when the mean precipitate size is made greater than the threshold precipitate size of occurrence of nodular corrosion, nodular corrosion occurs to drastically lower the resistance to corrosion. Therefore, for optimum specifications, it is necessary to specify the mean precipitate size smaller than the threshold precipitate size of occurrence of nodular corrosion. On the basis of the above-described outcome of our studies, specifications for zirconium-base alloys that are excellent in both corrosion resistance and hydrogen absorption characteristics are established. Herein obtained are specifications for zirconium-base alloys for nuclear reactors, comprising Sn, Fe, Ni, Cr, Zr and unavoidable impurities, which are the same constituent elements as those of Zircaloy-2.

The relative hydrogen absorption rapidly lowers to approximately 0.6, but tends not to become below 0.6 any more because saturation occurs. Therefore, specifications are established so that the relative hydrogen absorption can be 0.6 or less of that of the conventional materials. The Fe content is set at not more than 0.6 wt. % because a zirconium-base alloy having an Fe content of more than 0.6 wt. % has worsened processing characteristics and ductility. Namely, defined herein is a zirconium-base alloy having a composition and mean precipitate size that are included in a region on the x (Fe content wt. %) and y (mean precipitate size (nm)) rectangular coordinates, surrounded by the following five lines: i) $Y=-989 \times X+362$, ii) $Y=910 \times X-46$, iii) $Y=0$, iv) $Y=300$ and v) $X=0.6$.

Figure 2:
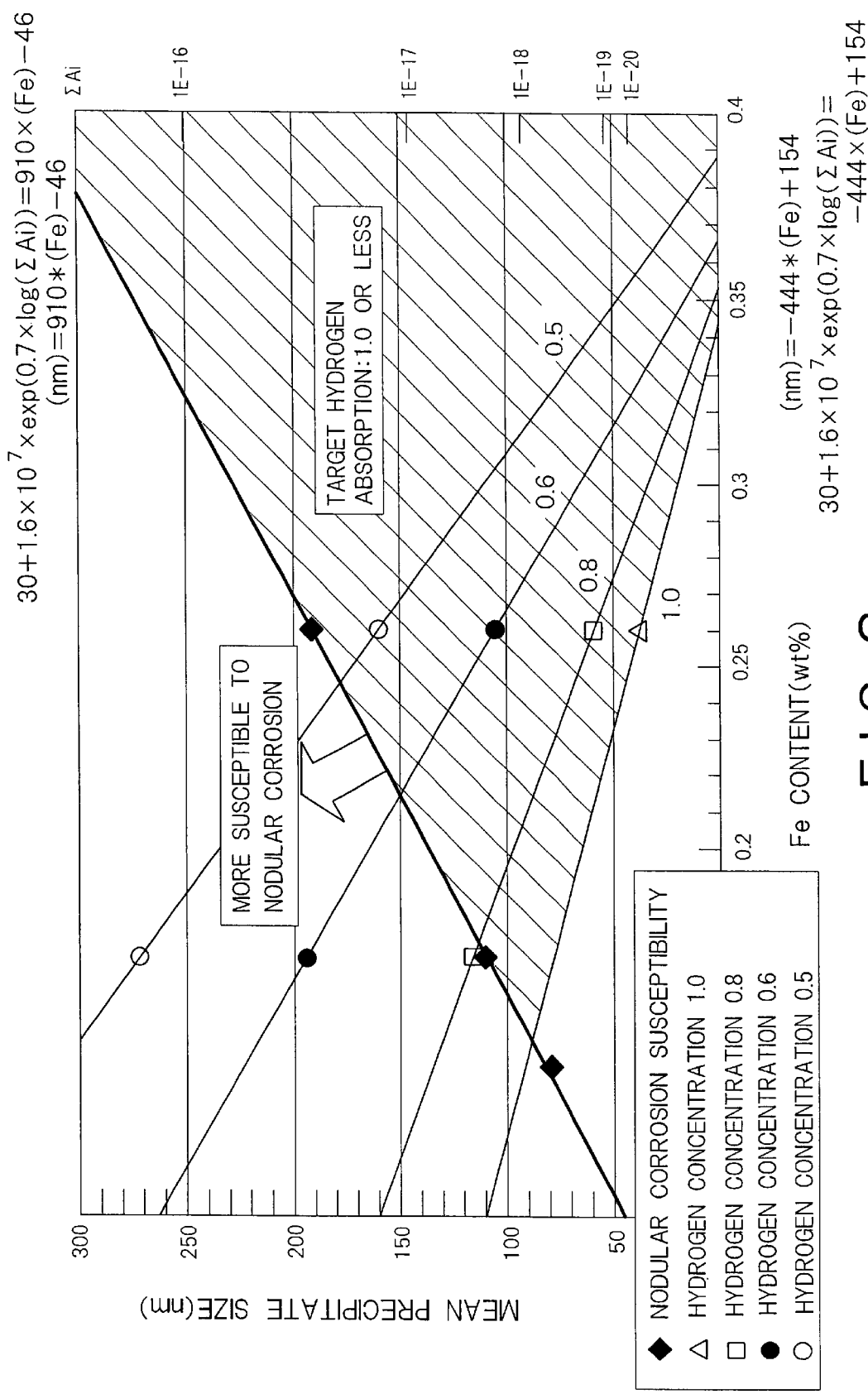
FIG. 2 is a diagram showing the material specifications in the present invention (the target hydrogen absorption is not more than the hydrogen absorption of the conventional materials), plotting Fe content (wt. %) as the abscissa, mean precipitate size (nm) as the Y-axis, and $\Sigma Ai$ as the Y2-axis.

In the case where specifications that make the hydrogen absorption equal to or less than the current one, that is, specifications that make the relative hydrogen absorption equal to or less than 1, are established by taking the hydrogen absorption range wider as shown in FIG. 2, there is defined a zirconium-base alloy having a composition and mean precipitate size that are included in a region on the x (Fe content wt. %) and y (mean precipitate size (nm)) rectangular coordinates, surrounded by the following five lines: i) $Y=-444 \times X+154$, ii) $Y=910 \times X-46$, iii) $Y=0$, iv) $Y=300$ and v) $X=0.6$.

Further, the mean precipitate size depends on heat treatment conducted in the production process. Annealing parameter ($\Sigma Ai$) is known as a quantified index of this heat treatment. It is to quantify, by using the following equation, the amount of heat a zirconium-base alloy gains after the $\alpha+\beta$ or $\beta$-quenching:

$$\Sigma Ai = \Sigma ti \times \exp(-40,000/Ti)$$

wherein ti is a retention time (h) at a heat treatment temperature Ti, and Ti is a heat treatment temperature (K).

Existing between this annealing parameter ($\Sigma Ai$) and mean precipitate size (nm) is a relationship represented by the following equation:

$$\text{mean precipitate size (nm)} = 30 + 1.6 \times 10^7 \times \exp(0.7 \times \log(\Sigma Ai)).$$

Therefore, the above-established material specifications for two zirconium alloys can be expressed in the below-described way by replacing the mean precipitate size by $\Sigma Ai$. In FIGS. 1 and 2, the values of $\Sigma Ai$ are plotted as the Y-2 axis, and the upper and lower limits of $\Sigma Ai$ are 1E–15 (i.e., $1 \times 10^{-15}$) and 1E–21 (i.e., $1 \times 10^{-21}$), respectively.

If the above-described annealing parameter is used, the aforementioned zirconium-base alloy according to the present invention can be defined as a zirconium-base alloy for nuclear reactors, comprising Sn, Fe, Ni, Cr, Zr and unavoidable impurities, wherein the Fe content (X wt. %) and the annealing parameter ($\Sigma Ai$) of the zirconium-base alloy are present in a region on the x (Fe content X) and y (annealing parameter) rectangular coordinates, surrounded by the following five lines: i) $30+1.6\times10^7\times\exp(0.7\times\log(Y))=-444\times X+154$, ii) $30+1.6\times10^7\times\exp(0.7\times\log(Y))=910\times X-46$, iii) $Y=1\times10^{-21}$, iv) $Y=1\times10^{-15}$, and v) $X=0.6$.

A particularly preferable zirconium-base alloy according to the present invention is one whose Fe content (X wt. %) and annealing parameter ($\Sigma Ai$) are present in a region on the x (Fe content X) and y (annealing parameter) rectangular coordinates, surrounded by the following five lines: i) $30+1.6\times10^7\times\exp(0.7\times\log(Y))=-989\times X+362$, ii) $30+1.6\times10^7\times\exp(0.7\times\log(Y))=910\times X-46$, iii), $Y=1\times10^{-21}$, iv) $Y=1\times10^{-15}$, and v) $X=0.6$.

The zirconium-base alloys according to the present invention comprise Sn, Fe, Ni, Cr, Zr and unavoidable impurities. The Fe content is specified in consideration of correlation with mean precipitate size or annealing parameter ($\Sigma Ai$), as described above. The contents of the essential components other than Fe are as follows: the Sn content is from 0.5 to 2 wt. %, the Ni content is from 0.03 to 0.2 wt. %, the Cr content is from 0.05 to 0.2 wt. %, and the balance comprises Zr and unavoidable impurities.

Sn is a constituent particularly useful for imparting improved strength and corrosion resistance to zirconium-base alloys. A zirconium-base alloy containing less than 0.5 wt. % of Sn cannot show sufficiently high strength, while a zirconium-base alloy containing more than 2 wt. % of Sn has worsened corrosion resistance. Therefore, from 0.5 to 2 wt. % is the Sn content specified in the present invention. A preferable Sn content range in the present invention is from 0.8 to 1.5 wt. %.

Ni is a constituent particularly useful for imparting improved corrosion resistance to zirconium-base alloys. When Ni is incorporated into a zirconium-base alloy in an amount of less than 0.03 wt. %, the effect of improving corrosion resistance cannot fully be obtained. On the other hand, a zirconium-base alloy containing more than 0.2 wt. % of Ni has remarkably worsened hydrogen absorption property. The Ni content specified in the present invention is, therefore, from 0.03 to 0.2 wt. %. A preferable Ni content range in the present invention is from 0.05 to 0.10 wt. %.

Cr is a constituent particularly useful for imparting improved corrosion resistance to zirconium-base alloys. This element governs the proportions of two types ($Zr_2(Fe, Ni)$ type and $Zr(Fe, Cr)_2$ type) of precipitates, mainly present in a zirconium-base alloy containing Fe, Ni and Cr, and indirectly affects the corrosion resistance and hydrogen absorption property of the zirconium-base alloy. When Cr is incorporated into a zirconium-base alloy in an amount of less than 0.05 wt. %, the effect of improving corrosion resistance cannot fully be obtained, while when the Cr content is made more than 0.2 wt. %, the distribution of precipitates is adversely affected. The Cr content specified in the present invention is, therefore, from 0.05 to 0.2 wt. %. A preferable Cr content range in the present invention is from 0.07 to 0.15 wt. %.

A zirconium-base alloy according to the present invention can be produced in the following manner, for example.

An ingot melt is subjected to hot forging (e.g., at 700 to 750° C.) and solution treatment (e.g., at approximately 1000° C. for several hours), and is then made into a billet for extrusion by conducting cutting, surface grinding and drilling. A double billet may also be made by the combination use of two alloys having different chemical compositions. The billet for extrusion is then subjected, for example, to hot extrusion at 600 to 700° C. to obtain a tubeshell. In general, this tubeshell is alternately subjected to cold rolling and annealing three times to obtain a fuel cladding tube.

Alternatively, in order to obtain a fuel cladding tube with improved corrosion resistance, the following method may be adopted: $\alpha+\beta$ or $\beta$-quenching is conducted before the first, second or third cold rolling step, and, after the $\alpha+\beta$ or $\beta$-quenching is completed, cold rolling and annealing are alternately conducted. The $\alpha+\beta$ or $\beta$-quenching, may be conducted in any of the following manners: the outer surface of the tubeshell is heated to a temperature (e.g., approximately 930° C.) in the temperature range in which the alloy exists in $\alpha+\beta$ phase (a so-called tubeshell heat treatment); the $\alpha+\beta$ or $\beta$-quenching is conducted in a series of the steps of cold rolling and annealing, usually repeated approximately three times, for making the tubeshell into a fuel cladding tube; or the $\alpha+\beta$ or $\beta$-quenching is conducted in the course of the production of the tubeshell. The zirconium alloys according to the present invention are applicable to any of the above manners. The quantification of heat treatment by using annealing parameter ($\Sigma Ai$) can also be applied to any of the above manners. In this case, the amount of heat a zirconium alloy gains after the lastly conducted $\alpha+\beta$ or $\beta$-quenching is quantified by the annealing parameter.

The above-described zirconium-base alloys according to the present invention are excellent in both corrosion resistance and hydrogen absorption property and are useful, for example, for a variety of nuclear reactor components, in particular, for fuel cladding tubes in fuel assemblies, pacer bands, spacer cells and water rods.

EXAMPLES

Example 1 & Comparative Example 1

Figure 5:
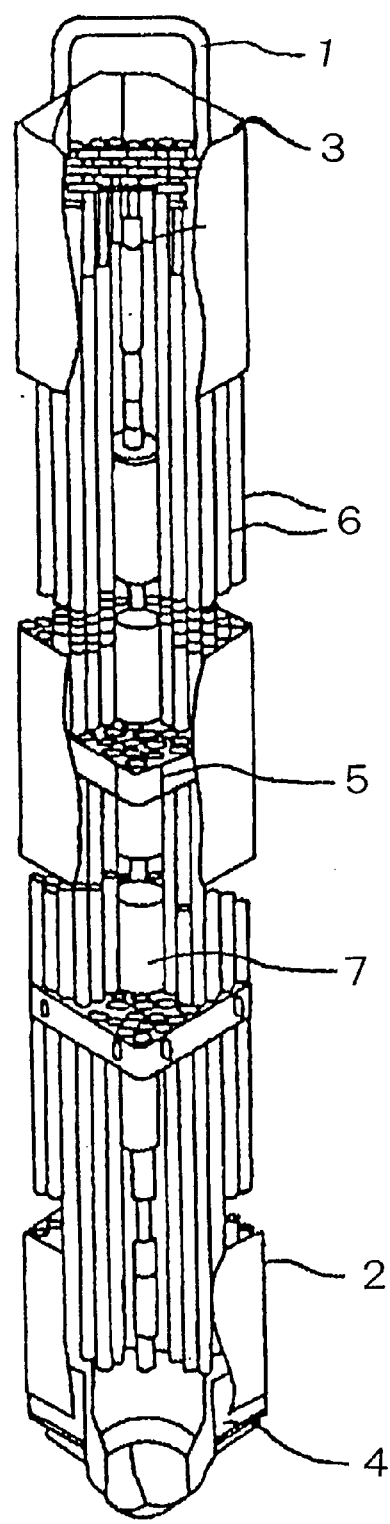
FIG. 5 is a perspective view showing the structure of a fuel assembly 1 composed of a channel box 2, an upper tie plate 3, a lower tie plate 4, a spacer 5, fuel rods 6 and a water rod 7.
Figure 6:
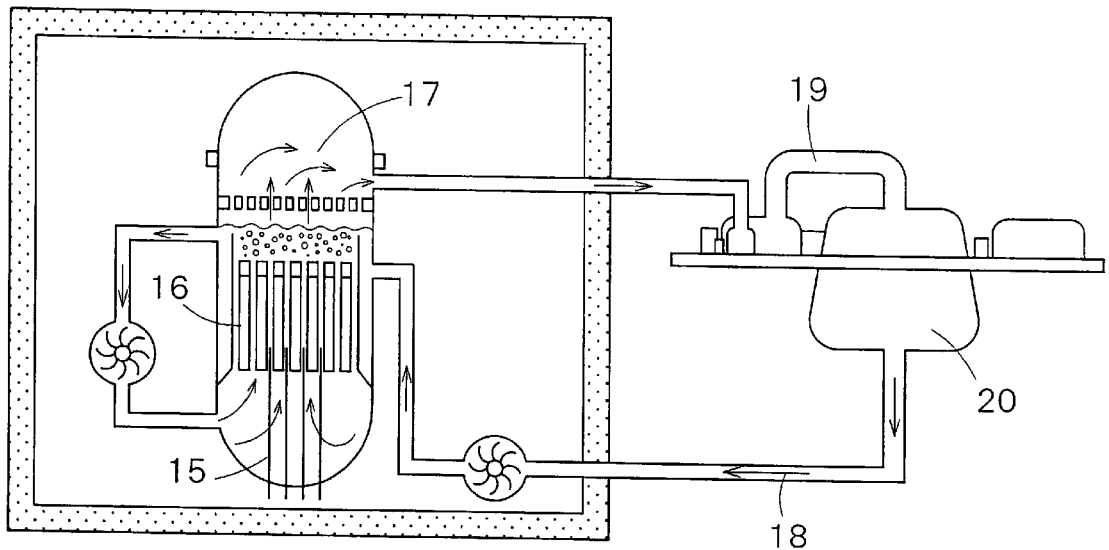
FIG. 6 is a diagrammatical view roughly showing the constitution of a boiling-water reactor composed of a core 15, a fuel element 16, a turbine 19 and a condenser 20, steam 17 and water 18 being circulated in the reactor.

An example of the practical use of an alloy of the present invention as a nuclear reactor material will be given hereinafter. FIG. 5 is a perspective view of a fuel assembly to be placed in a boiling-water reactor, and FIG. 6 is a diagrammatical view of a boiling-water reactor. In the reactor, water 18 is changed to steam 17 by the thermal energy generated by a fuel element 16 in a core 15, and a turbine 19 is rotated by the steam to produce electric power. The steam once used is returned to water by a condenser 20; the water is re-circulated and is changed to steam again. The fuel element 16 shown in FIG. 6 is composed of a plurality of fuel assemblies, one fuel assembly being shown in FIG. 5. The fuel assembly 1 is composed of rod-shaped elements such as a predetermined number of fuel rods 6 and a water rod 7, which are arranged in a grid pattern in a channel box 2. The upper and lower ends of the rod-shaped elements are connected to an upper tie plate 3 and a lower tie plate 4 through an upper end plug and a lower end plug, respectively, and spacers 5 are arranged at predetermined intervals at a plurality of points between upper and lower end plugs. In FIG. 5, the channel box, water rod, fuel rods and spacers are in direct contact with water. These components are currently made from Zircaloy-2 or Zircaloy-4, and are required to show higher corrosion resistance and lower hydrogen absorption.

Figure 7:
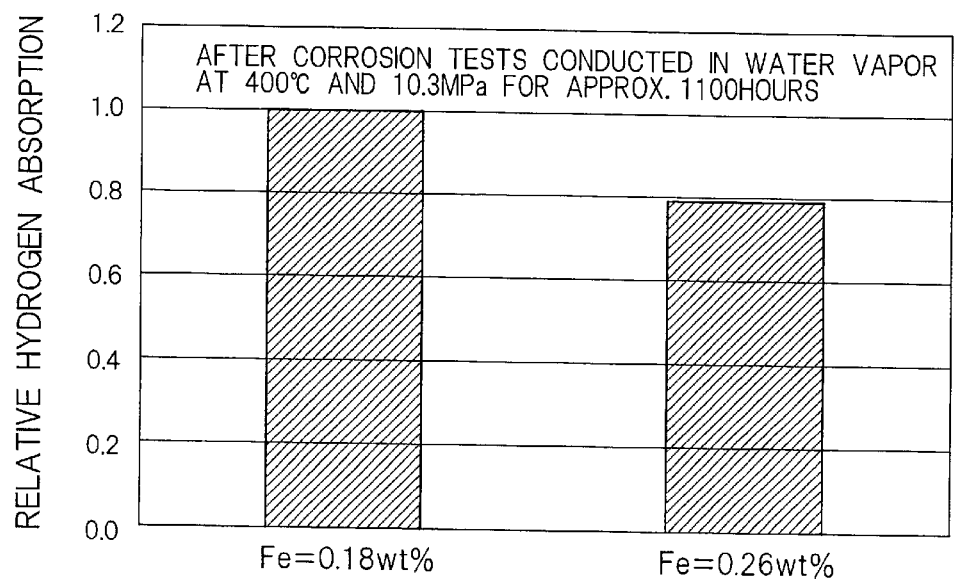
FIG. 7 is a graph showing the amounts of hydrogen absorbed by two materials, determined by corrosion tests conducted in water vapor at 400° C. and 10.3 MPa, where the graph plots relative hydrogen absorption as the Y-axis.

FIG. 7 shows the results (after approximately 1100 hours) of corrosion tests carried out in water vapor at 400° C. and 10.3 MPa, using an experimental alloy having a composition within the specifications established in the present invention, and a comparative zirconium-base alloy.

Subjected to the corrosion tests were specifically a zirconium-base alloy containing 0.18 wt. % of Fe (Comparative Example 1) and a zirconium-base alloy of the present invention, containing 0.26 wt. % of Fe (Example 1). The mean size of precipitates in each alloy is approximately 80 nm, which is nearly equal to the mean size of precipitates in the conventional Zircaloy-2.

Specifically, the alloy of Example 1 and that of Comparative Example 1 are as follows:

Comparative Example 1: a zirconium-base alloy containing 1.35 wt. % Sn, 0.18 wt. % Fe, 0.07 wt. % Ni, 0.11 wt. % Cr, and the balance being Zr, and Example 1: a zirconium-base alloy containing 1.35 wt. % Sn, 0.26 wt. %. Fe, 0.07 wt. % Ni, 0.11 wt. % Cr, and the balance being Zr.

These two alloys were made in the following manner.

A ingot melt was subjected to hot forging (at 700 to 750° C.) and solution treatment (at approximately 1000° C. for several hours), and was then made into a billet for extrusion by conducting cutting, surface grinding and drilling. This billet for extrusion was subjected to hot extrusion at 600 to 700° C. to obtain a tubeshell. The outer surface of this tubeshell was treated by the previously mentioned tubeshell heat treatment, that is, the outer surface of the tubeshell was heated to a temperature (e.g., approximately 930° C.) at which the alloy exists in $\alpha+\beta$ phase, and was then alternately subjected to cold rolling and annealing three times to obtain a fuel cladding tube.

The graph in FIG. 7 shows that the hydrogen absorption of the zirconium-base alloy of Example 1 is 0.8 when the Fe content increases, compared with the zirconium-base alloy of Comparative Example 1. On the other hand, it can be predicted from FIG. 1 that the relative hydrogen absorption will decrease from 1.1 to 0.8 when the Fe content increases from 0.18 wt. % to 0.26 wt. %. This prediction well agrees with the test results shown in FIG. 7. It can thus be known that the improved zirconium-base alloy of the present invention is superior to the conventional alloy in hydrogen absorption property.

Thus, by using, instead of Zircaloy-2 or -4, the improved zirconium-base alloy of the present invention for the above-described components, it becomes possible to provide a fuel assembly that is superior to the conventional one particularly in hydrogen absorption property.

Example 2

Figure 8:
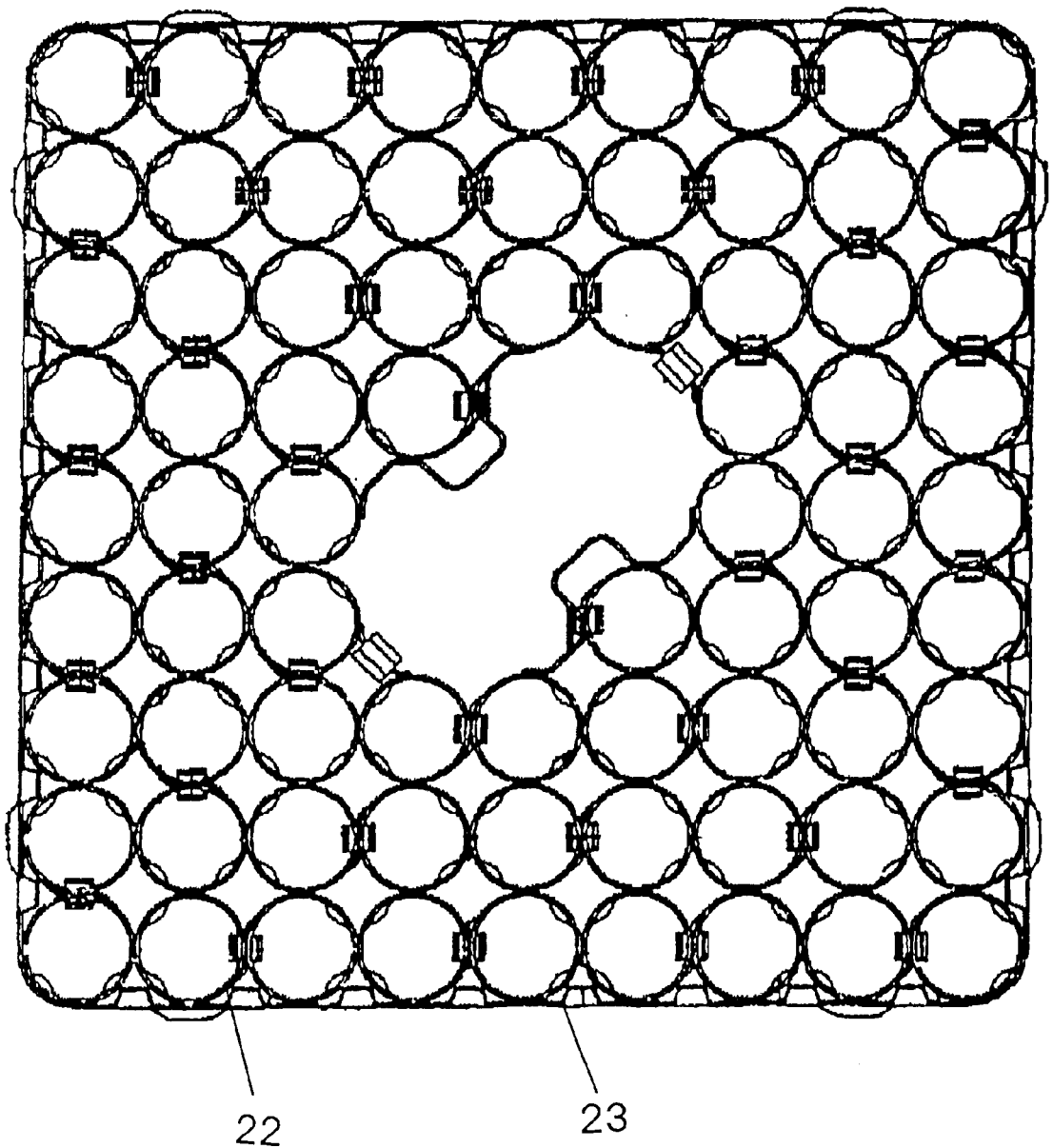
FIG. 8 is a view showing the structure of a spacer 21 having spacer cells 22 and a spacer band 23.

FIG. 8 is a view showing the spacer shown in FIG. 5. A spacer has the function of bundling fuel rods individually placed in spacer cells to arrange them properly. To achieve higher fuel performance by increasing uranium inventory and by decreasing pressure loss, it is presently required to decrease the wall thickness of spacer cells or spacer bands. However, the concentration of hydrogen in a material increases almost inversely proportional to the thickness of the material, and the ductility and strength properties of the material are greatly governed by the concentration of hydrogen in the material. It is, therefore, difficult to further decrease wall thickness with the conventional hydrogen absorption property left as they are. Decrease in hydrogen absorption is particularly required for spacers. For example, if it is possible to obtain a spacer whose hydrogen absorption is only 50% of that of the conventional spacer, this spacer can have a decreased wall thickness while retaining ductility and strength equal to those of the conventional spacer. If the alloy of the present invention is used for a spacer as shown in FIG. 8, the hydrogen absorption of the spacer becomes 50% of that of the conventional spacer, so that it becomes possible to make the spacer wall thin to an extent unattainable by the use of the conventional materials.

Example 3

FIG. 9 is a view showing the fuel rod 6 shown in FIG. 5. The fuel rod is composed of a nuclear fuel material 9 that causes fissile reaction to generate heat, a fuel cladding tube 8, a plenum 12, an upper end plug 13 and a lower end plug 14. FIG. 9A is a perspective view of the fuel rod, FIG. 9B is a cross-sectional view of the fuel rod, and FIG. 9C is a longitudinal sectional view of the fuel rod. In FIG. 9, reference numeral 8 designates a fuel cladding tube, in which a nuclear fuel material 9 is stacked. A conventional fuel cladding tube 8 is composed of a tube 10 made of zircaloy-2 and a liner layer 11 made of pure zirconium, laid on the inner surface of the tube 10. By producing the tube 10, which is required to have high corrosion resistance and low hydrogen absorption, using the improved zirconium alloy of the present invention in place of Zircaloy-2, it becomes possible to obtain a fuel rod having more excellent corrosion resistance.

What is claimed is:

1. A zirconium-base alloy for nuclear reactors, comprising:
   0.5–2 wt. % Sn,
   0.07–0.6 wt. % Fe,
   0.03–0.2 wt. % Ni,
   0.05–0.2 wt. % Cr, the balance being zirconium and unavoidable impurities,
   wherein the zirconium-base alloy has an Fe content X, in weight percent, and precipitates having a mean size Y, in nanometers,
   and further wherein
   the Fe content of the zirconium-base alloy and the mean size of the precipitates in the zirconium-base alloy simultaneously satisfy each of the following relationships:
   i) $Y \geq -444 \times X + 154$;
   ii) $Y \leq 910 \times X - 46$;
   iii) $Y \geq 0$;
   iv) $Y \leq 300$; and
   v) $X \leq 0.6$.

2. The zirconium-base alloy for nuclear reactors according to claim 1, wherein:
   the relationship i) is $Y \geq -989 \times X + 362$.

3. A zirconium-base alloy for nuclear reactors, comprising:
   0.5–2 wt. % Sn,
   0.07–0.6 wt. % Fe,
   0.03–0.2 wt. % Ni,
   0.05–0.2 wt. % Cr, with the balance being zirconium and unavoidable impurities,
   wherein the zirconium-base alloy has an Fe content X, in weight percent, and an annealing parameter Y ($\Sigma Ai$);
   and further wherein
   the Fe content and the annealing parameter of the zirconium-base alloy simultaneously satisfy each of the following relationships:
   i) $30 + 1.6 \times 10^7 \exp(0.7 \times \log(Y)) \geq -444 \times X + 154$;
   ii) $30 + 1.6 \times 10^7 \exp(0.7 \times \log(Y)) \leq 910 \times X - 46$;
   iii) $Y \geq 1 \times 10^{-21}$
   iv) $Y \leq 1 \times 10^{-15}$; and
   v) $X \leq 0.6$.

4. The zirconium-base alloy for nuclear reactors according to claim 3, wherein relationship i) is $$30 + 1.6 \times 10^7 \times \exp(0.7 \times \log(Y)) \geq -989 \times X + 362.$$

5. A nuclear reactor component comprising a zirconium-base alloy as claimed in claim 1.

6. The nuclear reactor component according to claim 5, which is a fuel cladding tube for use in a fuel assembly, a spacer band, spacer cells, or a water rod.

* * * * *